United States Patent
Hasegawa et al.

(10) Patent No.: US 11,289,889 B2
(45) Date of Patent: Mar. 29, 2022

(54) ATTACHMENT STRUCTURE OF WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Hitoshi Hasegawa, Mie (JP); Yuya Fukami, Mie (JP); Masaki Mizushita, Mie (JP); Motohiro Yokoi, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/050,144

(22) PCT Filed: Feb. 22, 2019

(86) PCT No.: PCT/JP2019/006825
§ 371 (c)(1),
(2) Date: Oct. 23, 2020

(87) PCT Pub. No.: WO2019/215995
PCT Pub. Date: Nov. 14, 2019

(65) Prior Publication Data
US 2021/0111545 A1    Apr. 15, 2021

(30) Foreign Application Priority Data

May 10, 2018 (JP) .............................. JP2018-091257

(51) Int. Cl.
H02G 3/30 (2006.01)
H02G 3/04 (2006.01)
(Continued)

(52) U.S. Cl.
CPC ........... H02G 3/30 (2013.01); B60R 16/0215 (2013.01); H01B 7/0045 (2013.01); H02G 3/04 (2013.01)

(58) Field of Classification Search
CPC ........ H02G 3/30; H02G 3/04; B60R 16/0215; B60R 16/0207; H01B 7/0045; H01B 7/40; F16L 3/12
(Continued)

(56) References Cited

U.S. PATENT DOCUMENTS 3,836,415 A * 9/1974 Hilderbrandt .... H01B 13/01254
156/181
4,468,089 A * 8/1984 Brorein ................ G02B 6/4403
156/53

(Continued)

FOREIGN PATENT DOCUMENTS

JP    2001-352636    12/2001
JP    2001352636  * 12/2001
(Continued)

OTHER PUBLICATIONS

International Search Report (ISR) issued in International Patent Application No. PCT/JP2019/006825, dated Apr. 9, 2019, along with an English translation thereof.
(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

An attachment structure of a wiring member includes a metal member provided in a vehicle and a wiring member
(Continued)

flatly formed to be disposed to have surface contact with the metal member and connecting an electrical component mounted to the vehicle. For example, the wiring member includes a plurality of electrical wires and a sheet material with one main surface having surface contact with the metal member and the other main surface on which the plurality of electrical wires are provided.

4 Claims, 2 Drawing Sheets

(51) Int. Cl.
   *B60R 16/02* (2006.01)
   *H01B 7/00* (2006.01)
(58) Field of Classification Search
   USPC .................................................. 174/72 A
   See application file for complete search history.

(56) References Cited

U.S. PATENT DOCUMENTS

| | | | | |
|---|---|---|---|---|
| 4,650,924 | A * | 3/1987 | Kauffman | H01B 7/0853 |
| | | | | 174/117 F |
| 4,862,011 | A * | 8/1989 | Wright | B60R 16/027 |
| | | | | 307/10.1 |
| 5,360,944 | A * | 11/1994 | Springer | H01B 7/0838 |
| | | | | 174/102 R |
| 6,111,203 | A * | 8/2000 | Cheng | H01B 7/0861 |
| | | | | 174/117 F |
| 8,598,461 | B2 * | 12/2013 | Lind | H02G 3/32 |
| | | | | 174/117 F |
| 10,483,015 | B2 * | 11/2019 | Chin | H01B 7/0225 |
| 2011/0043032 | A1 | 2/2011 | Suzuki et al. | |
| 2014/0116750 | A1 * | 5/2014 | Suzuki | H01B 7/0823 |
| | | | | 174/117 F |
| 2015/0036992 | A1 | 2/2015 | Fleming et al. | |

FOREIGN PATENT DOCUMENTS

| | | |
|---|---|---|
| JP | 2003-267161 | 9/2003 |
| JP | 2009-227070 | 10/2009 |
| JP | 2016-171678 | 9/2016 |
| JP | 2017-103102 | 6/2017 |
| WO | 2009/119702 | 10/2009 |

OTHER PUBLICATIONS

International Preliminary Report on Patentability (IPRP) issued in International Patent Application No. PCT/JP2019/006825, dated Nov. 12, 2020, along with an English translation thereof.
Japan Office Action issued in Japan Patent Application No. 2019-212192, dated Feb. 8, 2022, together with English translation thereof.

* cited by examiner

ATTACHMENT STRUCTURE OF WIRING MEMBER

TECHNICAL FIELD

The present disclosure relates to an attachment structure of a wiring member.

BACKGROUND ART

Patent Document 1 discloses, as a technique of attaching a wiring member to a vehicle, a technique of locating a wire harness including a plurality of electrical wires in a part where a reinforcement is covered with a protection member made up of plastic corrugated boards.

PRIOR ART DOCUMENTS

Patent Documents

Patent Document 1: Japanese Patent Application Laid-Open No. 2016-171678

SUMMARY

Problem to be Solved by the Invention

However, in the technique described in Patent Document 1, a reinforcement having a circular shape in cross-section is covered with a protection member folded into a rectangular shape in cross-section, and furthermore, a plurality of electrical wires are bundled to have a round shape in cross-section, so that heat of the electrical wires is hardly transmitted to the reinforcement properly.

An object of the present invention is to provide a technique capable of further increasing heat radiation properties in attaching a wiring member to a vehicle.

Means to Solve the Problem

An attachment structure of a wiring member according to the present disclosure is an attachment structure of a wiring member including: a metal member provided in a vehicle; and a wiring member flatly formed to be disposed to have surface contact with the metal member and connecting an electrical component mounted to the vehicle.

Effects of the Invention

According to the present disclosure, heat radiation properties can be further increased in attaching a wiring member to a vehicle.

DESCRIPTION OF EMBODIMENT(S)

Description of Embodiment of Present Disclosure

Embodiments of the present disclosure are listed and described firstly.

An attachment structure of a wiring member according to the present disclosure is as follows.

(1) The present disclosure relates to an attachment structure of a wiring member including a metal member provided in a vehicle and a wiring member flatly formed to be disposed to have surface contact with the metal member and connecting an electrical component mounted to the vehicle.

The flat wiring member has surface contact with the metal member, thus heat radiation properties can be further increased in attaching the wiring member to the vehicle.

(2) The wiring member preferably includes a plurality of wire-like transmission members and a sheet material with one main surface having surface contact with the metal member and the other main surface on which the plurality of wire-like transmission members are provided. It is because the flat wiring member can be formed using a generalized wire-like transmission member.

(3) A layer constituting the other main surface of the sheet material is preferably formed of a member including metal. It is because a part of the sheet material having contact with the wire-like transmission member includes metal, thus heat of the wire-like transmission member is easily transmitted to the sheet material.

(4) The metal member preferably has a curved part, and the wiring member preferably has flexibility and is curved and disposed to follow the curved part of the metal member. It is because a range capable of having surface contact is increased and heat radiation properties can be easily increased.

Details of Embodiment of Present Disclosure

Specific examples of an attachment structure of a wiring member of the present disclosure are described hereinafter with reference to the drawings. The present invention is not limited to these examples, but is indicated by claims, and it is intended that meanings equivalent to claims and all modifications within a scope of claims are included.

Embodiment

Figure 1:
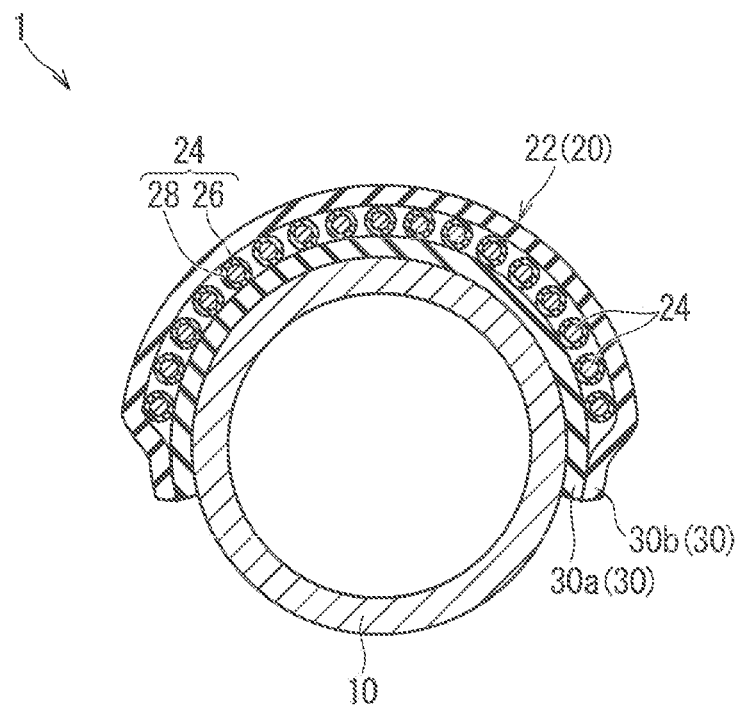
FIG. 1 is a cross-sectional view illustrating an attachment structure of a wiring member according to an embodiment.

An attachment structure of a wiring member according to an embodiment is described hereinafter. FIG. 1 is a cross-sectional view illustrating an attachment structure 1 of the wiring member according to the embodiment.

The attachment structure 1 of the wiring member includes a metal member 10 and a wiring member 20. The attachment structure 1 of the wiring member is made up of the wiring member 20 attached to a vehicle 80.

Figure 2:
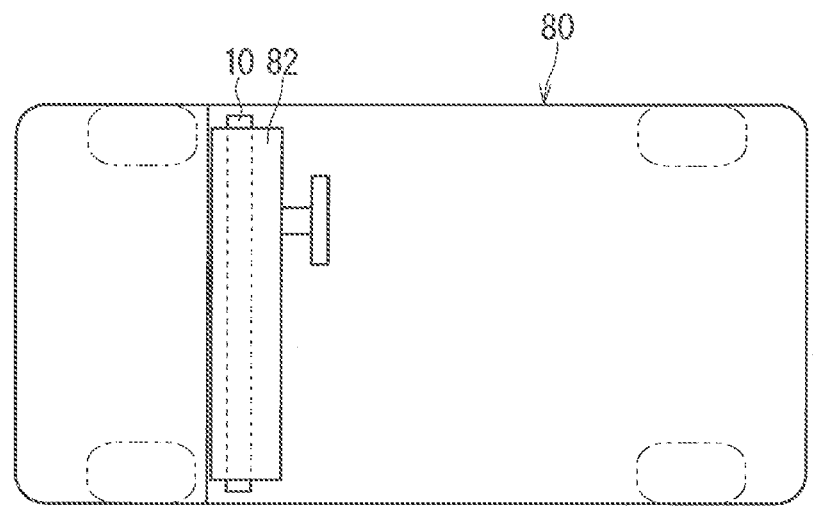
FIG. 2 is an explanation view illustrating an example of a metal member.

The metal member 10 is described with reference to FIG. 2 in addition to FIG. 1. FIG. 2 is an explanation view illustrating an example of the metal member 10.

The metal member 10 is provided in the vehicle 80. The metal member 10 is a part constituting a vehicle body, for example. In the description herein, the metal member 10 is a rod-like member such as a reinforcement provided to reinforce the vehicle body. Particularly, in the description herein, the reinforcement is an instrument panel reinforcement disposed behind an installment panel 82. In the example illustrated in FIG. 1, the metal member 10 is formed into a circular shape in cross-section, but may be formed into the other shape such as a rectangular shape or an H-shape. In the example illustrated in FIG. 1, the metal member 10 is formed into a hollow shape, but may be formed into the other shape such as a solid shape.

The metal member 10 is considered to have a curved part in an outer surface. As described above, the metal member 10 is the reinforcement formed into the rod-like shape herein. Accordingly, the metal member 10 has a part curved along a circumferential direction in the outer surface. It is obvious that the metal member 10 has a part curved in a longitudinal direction.

Figure 3:
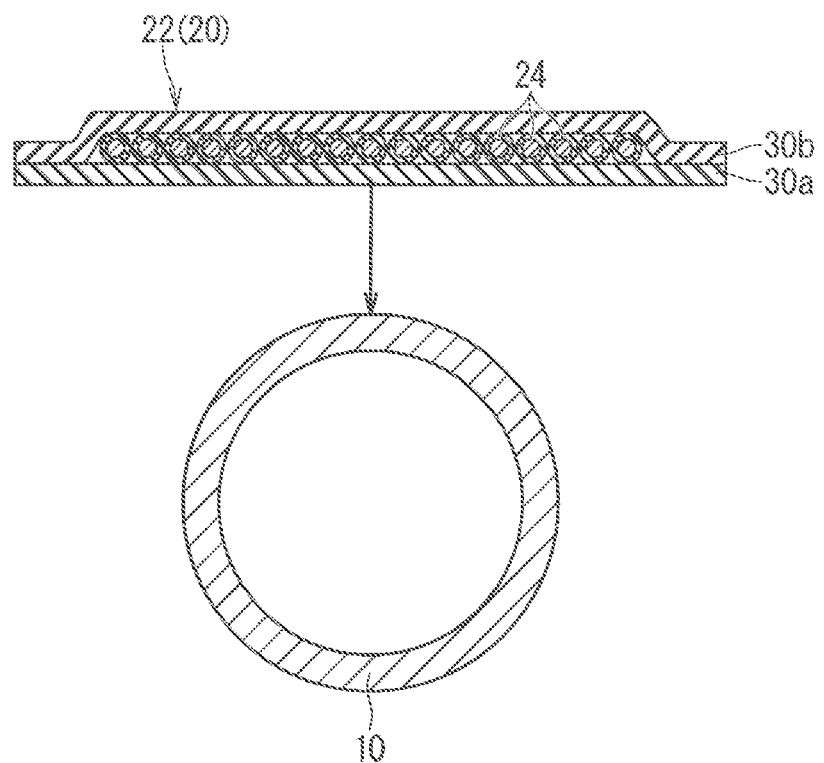
FIG. 3 is a cross-sectional view illustrating the wiring member before being attached to the metal member.

The wiring member 20 is described with reference to FIG. 3 in addition to FIG. 1. FIG. 3 is a cross-sectional view illustrating the wiring member 20 before being attached to the metal member 10.

The wiring member 20 is a member joined to a component mounted to the vehicle 80 to transmit electrical power or light to and/or from the component. The wiring member 20 is flatly formed. In the vehicle 80, the wiring member 20 is disposed to have surface contact with the metal member 10. In the description herein, the wiring member 20 is a sheet material-attached wire 22 including a plurality of wire-like transmission members 24 and the sheet material 30.

The wire-like transmission member 24 needs to be a wire-like member transmitting electrical power or light, for example. For example, the wire-like transmission member 24 may be a general wire having a core wire and a covering around the core wire, or may also be a shielded wire, an enamel wire, a nichrome wire, or an optical fiber. The wire-like transmission member 24 transmitting the electrical power may be various kinds of signal lines or various kinds of power lines.

In the description herein, the wire-like transmission member 24 is a general wire 24 (simply referred to as the electrical wire 24 hereinafter).

Each electrical wire 24 is a covered wire including a core wire 26 and an insulating covering 28 for covering the core wire 26. The core wire 26 is made up of one or a plurality of strands. The strand is formed of a conductor made of copper, copper alloy, aluminum, or aluminum alloy, for example. When the core wire 26 is made up of the plurality of strands, the plurality of strands are preferably stranded. The insulating covering 28 is formed by extrusion molding of a resin material such as polyvinyl chloride (PVC) or polyethylene (PE) around the core wire 26 or applying a resin coating of enamel, for example, around the core wire 26. Herein, the electrical wire 24 is a so-called round wire having a round shape in cross-section.

The plurality of electrical wires 24 are provided on the sheet material 30. The plurality of electrical wires 24 are parallelly provided on the sheet material 30. A route of the electrical wire 24 on the sheet material 30 may be linearly disposed, or curved and disposed, thus may be appropriately set.

An end portion of the electrical wire 24 is connected to an electrical component. Considered, for example, is that a terminal or a connector is provided on the end portion of the electrical wire 24, and the electrical wire 24 is connected to an electrical component via the terminal or connector. The end portion of the electrical wire 24 may extend from the sheet material 30 to an outer side, or may be located on the sheet material 30.

The wiring member 20 includes one of or both a conductive path supplying a power source (referred to as a power source line hereinafter) and a conductive path transmitting a signal (referred to as a signal line hereinafter). That is to say, the plurality of electrical wires 24 include the electrical wire used as one of or both the power source line and the signal line. Herein, comparing the power source line with the signal line, the power source line normally has a higher current value and generates heat more easily. Accordingly, the plurality of electrical wires 24 preferably include at least the electrical wire used as the power source line. Accordingly, heat radiation properties of the power source line can be increased.

In the example illustrated in FIG. 1, all of the plurality of electrical wires 24 have the same size, however, this configuration is not necessary, thus the plurality of electrical wires 24 may include the electrical wire 24 having a different size. For example, when the plurality of electrical wires 24 include the electrical wire used as the power source line and the electrical wire used as the signal line as described above, it is considered that the electrical wire used as the power source line has a diameter larger than the electrical wire used as the signal line.

The sheet material 30 holds the plurality of electrical wires 24. Herein, the sheet material 30 keeps the plurality of electrical wires 24 in a parallelly disposed state. Herein, a first sheet material 30a located on an inner side (a side of the metal member 10) of the electrical wire 24 and a second sheet material 30b located on an outer side (a side opposite to the metal member 10) of the electrical wire 24 are provided as the sheet material 30. Both the first sheet material 30a and the second sheet material 30b are formed of a resin material such as PVC, polyethylene terephthalate (PET), and polypropylene (PP). The first sheet material 30a and the second sheet material 30b may be formed of the same material or a material different from each other.

Herein, the electrical wire 24 is joined to only the first sheet material 30a. However, the electrical wire 24 may be joined to only the second sheet material 30b, or may also be joined to both the first sheet material 30a and the second sheet material 30b. When the electrical wire 24 is joined to only one sheet material 30 of the first sheet material 30a or the second sheet material 30b, the other sheet material 30 functions as a cover preventing the electrical wire 24 from being detached from one sheet material 30.

Welding is adopted herein as a means of joining the electrical wire 24 and the sheet material 30. That is to say, at least one of the electrical wire 24 and the sheet material 30 has a resin material, and the resin material is melt to be joined to the other element. Herein, the insulating covering 28 and the resin sheet material 30 are melted together and mutually joined. In this case, the insulating covering 28 and the resin sheet material 30 preferably include the same resin material.

The welding means is not particularly limited, however, adoptable are various welding means such as ultrasonic welding, heating and pressurizing welding, hot-air welding, and high-frequency welding.

One main surface of the first sheet material 30a has surface contact with the metal member 10. The plurality of electrical wires 24 are provided on the other main surface of the first sheet material 30a. As described above, the first sheet material 30a has a function of being joined to the plurality of electrical wires 24 to flatly hold the plurality of electrical wires 24. The first sheet material 30a has a function of protecting the electrical wire 24 from a burr which may occur in the metal member 10. The first sheet material 30a has a function of receiving heat generated in the electrical wire 24 and transmitting the heat to the metal member 10.

The second sheet material 30b has a function of preventing the electrical wire 24 from being detached from the first sheet material 30a and protecting the electrical wire 24 from a member surrounding the electrical wire 24. The second sheet material 30b has a function of receiving heat generated in the electrical wire 24 and transmitting the heat into the air. Moreover, herein, the second sheet material 30b is joined to the first sheet material 30a on a lateral side of the electrical wire 24. Accordingly, the second sheet material 30b has a function of receiving heat generated in the electrical wire 24 and transmitting the heat to the first sheet material 30a via the joining part.

Welding is adopted herein as a means of joining the first sheet material 30a to the second sheet material 30b. For example, at least one of the first sheet material 30a and the second sheet material 30b has a resin material, and the resin material is melt to be joined to the other element. Herein, both the first sheet material 30a and the second sheet material 30b are made of resin, and the resin is melted together and mutually joined. In this case, the first sheet material 30a and the second sheet material 30b preferably include the same resin material.

The welding means is not particularly limited, however, adoptable are various welding means such as ultrasonic welding, heating and pressurizing welding, hot-air welding, and high-frequency welding. At this time, the means of welding the sheet material 30 and the electrical wire 24 may be the same as or different from the means of welding the first sheet material 30a and the second sheet material 30b.

The wiring member 20 has flexibility. Due to the flexibility, the wiring member 20 is curved and disposed to follow a curved part of the metal member 10.

More specifically, herein, the metal member 10 is a rod-like member such as a reinforcement and has a part curved along a circumferential direction in an outer surface. The wiring member 20 has flexibility in a direction of being disposed along the circumferential direction of the metal member 10 (herein, a direction in which the electrical wires 24 are arranged). More specifically, the sheet material 30 has flexibility herein. At this time, even when the electrical wire 24 is disposed on the sheet material 30, the electrical wire 24 does not interfere the flexibility of the sheet material 30. Accordingly, the wiring member 20 has the flexibility, and the wiring member 20 can be curved and disposed along the circumferential direction of the metal member 10 having the part curved in the circumferential direction, thus the wiring member 20 can have surface contact with the circumferential direction of the metal member 10.

A method of fixing the metal member 10 and the wiring member 20 is not particularly limited, however, various fixing methods can be adopted. Considered, for example, is that an adhesive tape is wound around the metal member 10 and the wiring member 20 to fix them in a state where the wiring member 20 is disposed along the metal member 10. Considered, for example, is that a locking member provided on the wiring member 20 is locked and fixed to the metal member 10.

According to the attachment structure 1 of the wiring member having the above configuration, the flat wiring member 20 has surface contact with the metal member 10, thus the heat generated in the wiring member 20 is easily transmitted to the metal member 10. Accordingly, the heat radiation properties can be further increased in attaching the wiring member 20 to the vehicle 80.

The wiring member 20 includes the plurality of electrical wires 24 and the sheet material 30, thus the flat wiring member 20 can be formed using the generalized electrical wire 24.

The wiring member 20 is curved to follow the curved part of the metal member 10 in accordance with the flexibility of the wiring member 20 itself, thus a range in which the wiring member 20 can have surface contact with the metal member 10 is increased and the heat radiation properties can be increased.

Furthermore, a heat radiation effect of the electrical wire 24 is increased in the attachment structure 1 of the wiring member, thus there may be a case where a cross-section area of the conductor can be downsized in at least one of the plurality of electrical wires 24. The electrical wire 24 is downsized, thus reduction in weight and thickness can be achieved.

More specifically, allowable current is defined for the electrical wire 24, and a circuit is designed so that actual current does not exceed the allowable current or a value obtained by subtracting a value corresponding to a safe rate from the allowable current. The allowable current depends on a material, a shape, and an arrangement form of the electrical wire 24, for example. Particularly, the allowable current has a positive correlationship with the cross-section area of the conductor. The allowable current has a negative correlationship with a thermal resistance. Accordingly, when the allowable current of the electrical wire 24 is intended to be set equal to or larger than a predetermined value, the cross-section area of the conductor can be reduced by reducing the thermal resistance. Herein, the wiring member 20 has surface contact with the metal member 10, thus the thermal resistance can be reduced, and as a result, the cross-section area of the conductor can be reduced.

The size of the cross-section area of the conductor in an electrical wire for automobile is defined herein, and an electrical wire for automobile in conformity with the size is generally used. Examples of a standard thereof include an automobile standard (JASO) D611 determined by Society of Automotive Engineers of Japan, Inc. Thus, in the case where the electrical wire 24 is downsized by reducing the thermal resistance, the downsizing can be achieved when there is a size having the allowable current exceeding the allowable current desired to be obtained in a smaller size. In contrast, when there is no size having the allowable current exceeding the allowable current desired to be obtained in the smaller size, the downsizing cannot be achieved.

Modification Example

Figure 4:
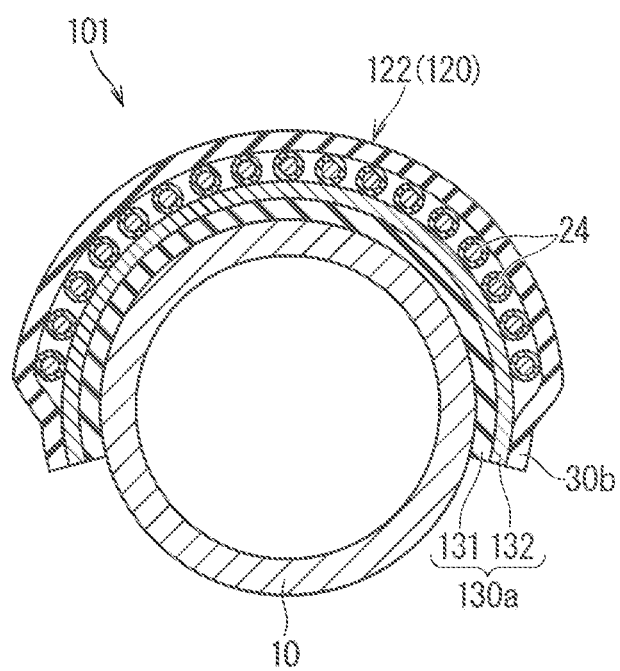
FIG. 4 is a cross-sectional view illustrating an attachment structure of a wiring member according to a modification example.

FIG. 4 is a cross-sectional view illustrating an attachment structure 101 of a wiring member according to a modification example.

In the description of the embodiment, the layer constituting the other main surface of the first sheet material 30a where the electrical wire 24 is disposed is made of resin, however, this configuration is not necessary. As is a case in a sheet material-attached electrical wire 122 of a wiring member 120 in the attachment structure 101 of the wiring member according to the modification example, a layer constituting the other main surface of a first sheet material 130a is also considered to be formed of a material including metal. Herein, the first sheet material 130a is formed by stacking a metal second layer 132 on a resin first layer 131. The resin first layer 131 constitutes one main surface and the metal second layer 132 constitutes the other main surface. Such a first sheet material 130a can be formed by joining metal foil to a resin sheet or evaporating metal on a resin sheet. Such a metal is not particularly limited, however, copper or aluminum, for example, can be adopted.

At this time, welding can be adopted as a means of joining the first sheet material 130a and the second sheet material 30b in the manner similar to the above embodiment. In this case, it is considered that a resin material of the second sheet material 30b is melted to be joined to the other main surface of the first sheet material 130a.

According to the attachment structure 1 of the wiring member according to the present example, the part of the first sheet material 130a having contact with the electrical wire 24 includes metal, thus heat of the electrical wire 24 is easily transmitted to the first sheet material 130a. An area of contact between the electrical wire 24 and the first sheet material 130a tends to be smaller than an area of contact between the first sheet material 130a and the metal member 10. Even in this case, the heat of the electrical wire 24 can be effectively transmitted to the first sheet material 130a.

In the example illustrated in FIG. 4, the second sheet material 30b is a member similar to the second sheet material 30b in the embodiment, and is made up of a resin single layer, however, it is also considered that the second sheet material 30b has a layer made up of a member including metal in the manner similar to the first sheet material 130a, and this layer has contact with the electrical wire 24. Particularly, it is also considered that the second sheet material has a double-layered structure of the resin first layer 131 and the second layer 132 including metal in the manner similar to the first sheet material 130a, and the second layer 132 including metal has contact with the electrical wire 24. It is also considered that the second sheet material is made up of a single layer including metal. In these cases, welding is considered as a means of joining the first sheet material 130a and the second sheet material. That is to say, main surfaces of both the first sheet material 130a and the second sheet material are made of metal, and metal is melted to be mutually joined.

Moreover, in the above description, the wiring member 20 is the sheet material-attached wire 22, however, this configuration is not necessary. The wiring member 20 may be a so-called flexible flat cable (FFC) in which a plurality of core wires are collectively covered by one covering or a so-called flexible printed circuits (FPC) in which a circuit is formed in conductive foil attached to an insulating film as a base.

Also when the wiring member 20 is the sheet material-attached wire 22, the configuration thereof is not limited to that described above. With regard to the type of the electrical wire 24, not the covered wire but a so-called bare wire made up of only the core wire 26 may be disposed on the sheet material 30, for example. In this case, it is sufficient that a layer of the sheet material 30 having direct contact with the bare wire has insulation properties. For example, the covered wire may be formed into a rectangular shape in cross-section. In this case, an area of contact between the sheet material 30 and the electrical wire 24 can be easily increased. With regard to the means of joining the electrical wire 24 and the sheet material 30, for example, it is applicable that a resin of at least one of the electrical wire 24 and the sheet material 30 is melted by heat or a solvent, thus the electrical wire 24 and the sheet material 30 are joined. A known joining means such as melting and joining, fusion, and welding can be adopted as the joining means. The electrical wire 24 and the sheet material 30 may be joined by an adhesive agent or an adhesive tape, for example. The electrical wire 24 may be sewn to the sheet material 30 by a sewing thread, for example. With regard to the means of joining the first sheet material 30a and the second sheet material 30b, for example, it is applicable that a resin of at least one of the two sheet materials 30a and 30b is melted by heat or a solvent, thus the sheet materials 30a and 30b are joined. A known joining means such as melting and joining, fusion, and welding can be adopted as the joining means. The two sheet materials 30a and 30b may be joined by an adhesive agent or an adhesive tape, for example. The two sheet materials 30a and 30b may be sewn to each other by a sewing thread, for example.

In the above description, the metal member 10 is the rod-like reinforcement, however, this configuration is not necessary. The metal member 10 is also considered a planar member such as a body panel. In this case, the metal member 10 is also considered not to have a curved part in the outer surface. The metal member 10 is also considered a rod-like member such as a pillar other than the reinforcement. At this time, one wiring member 20 is also considered to have surface contact with each of the plurality of metal members 10 in a different part along the longitudinal direction. One wiring member 20 is also considered to be sandwiched between the plurality of metal members 10 and have surface contact with them in the same part along the longitudinal direction.

The plurality of electrical wires 24 are also considered to be stacked. In this case, it is sufficient that the power source line is provided on an inner side, and the signal line is overlapped on an outer side of the power source line. Accordingly, heat radiation properties of the power source line which easily generates heat can be increased.

Each configuration described in the embodiment and each modification example can be appropriately combined as long as they are not contradictory.

EXPLANATION OF REFERENCE SIGNS 1, 101 attachment structure of wiring member
10 metal member
20, 120 wiring member
22, 122 sheet material-attached electrical wire
24 electrical wire (wire-like transmission member)
26 core wire
28 insulating covering
30 sheet material
30a, 130a first sheet material
30b second sheet material
131 first layer
132 second layer
80 vehicle
82 installment panel

The invention claimed is:
1. An attachment structure of a wiring member, comprising:
a metal member provided in a vehicle; and
a flat wiring member configured to be disposed in surface contact with the metal member and to connect an electrical component mounted to the vehicle, wherein
the flat wiring member is provided on an outer surface of the metal member, and
the flat wiring member includes a plurality of wire-like transmission members and a sheet material including a first main surface configured to be in surface contact with the outer surface of the metal member and a second main surface on which the plurality of wire-like transmission members are provided so as to contact the second main surface, the second main surface being provided on a rear side of the first main surface of the sheet material.

2. An attachment structure of a wiring member comprising:
a metal member provided in a vehicle; and
a flat wiring member configured to be disposed in surface contact with the metal member and to connect an electrical component mounted to the vehicle, wherein
the flat wiring member includes a plurality of wire-like transmission members and a sheet material including a first main surface configured to be in surface contact with the metal member and a second main surface on which the plurality of wire-like transmission members are provided so as to contact the second main surface, the second main surface being provided on a rear side of the first main surface of the sheet material, and
the sheet material includes a first layer including the first main surface and a second layer including the second main surface such that the first layer and the second layer are provided between the plurality of wire-like transmission members and the metal member, the second layer includes metal, and the first layer does not include metal.

3. The attachment structure of the wiring member according to claim 1, wherein
the metal member includes a curved part, and
the flat wiring member has flexibility and is curved and disposed to follow the curved part of the metal member.

4. The attachment structure according to claim 2, wherein the wiring member further includes a single-layered upper sheet material that does not include metal,
the upper sheet material provided such that the wire-like transmission members are provided between a main surface of the upper sheet material and the second main surface of the second layer of the sheet material, and the wire-like transmission members contact the main surface of the upper sheet material, and
the main surface of the upper sheet material is joined with the second main surface of the second layer of the sheet material by welding.

* * * * *